United States Patent
Wallace et al.

(10) Patent No.: US 9,647,936 B2
(45) Date of Patent: May 9, 2017

(54) METHODS, SYSTEMS, AND COMPUTER READABLE MEDIA FOR ROUTING DIAMETER MESSAGES AT A DIAMETER SIGNALING ROUTER

(71) Applicant: Tekelec, Inc., Morrisville, NC (US)

(72) Inventors: Donald Eugene Wallace, Boulder, CO (US); David Michael Sprague, Raleigh, NC (US); Jonathan James Palmer, Durham, NC (US); Thomas Michael Wagner, Raleigh, NC (US); Jeffrey Alan Craig, Durham, NC (US)

(73) Assignee: Tekelec, Inc., Morrisville, NC (US)

( * ) Notice: Subject to any disclaimer, the term of this patent is extended or adjusted under 35 U.S.C. 154(b) by 670 days.

(21) Appl. No.: 13/915,281

(22) Filed: Jun. 11, 2013

(65) Prior Publication Data
US 2013/0329740 A1 Dec. 12, 2013

Related U.S. Application Data

(63) Continuation-in-part of application No. 13/026,076, filed on Feb. 11, 2011, now Pat. No. 8,578,050.
(Continued)

(51) Int. Cl.
*H04L 12/721* (2013.01)
*H04L 12/725* (2013.01)
(Continued)

(52) U.S. Cl.
CPC .......... *H04L 45/44* (2013.01); *H04L 29/0653* (2013.01); *H04L 45/302* (2013.01);
(Continued)

(58) Field of Classification Search
CPC ....... H04L 45/00; H04L 45/121; H04L 45/20; H04L 45/302; H04L 29/0353
See application file for complete search history.

(56) References Cited

U.S. PATENT DOCUMENTS 6,157,621 A 12/2000 Brown et al.
6,795,546 B2 9/2004 Delaney et al.
(Continued)

FOREIGN PATENT DOCUMENTS

CA 2 716 544 A1 12/2010
CN 101136943 A 3/2008
(Continued)

OTHER PUBLICATIONS

Fajardo et al., "Diameter Base Protocol," RFC 6733, pp. 1-152 (Oct. 2012).
(Continued)

*Primary Examiner* — Michael Thier
*Assistant Examiner* — Brian Cox
(74) *Attorney, Agent, or Firm* — Jenkins, Wilson, Taylor & Hunt, P.A.

(57) ABSTRACT

According to one aspect, the subject matter described herein includes a method for routing Diameter messages. The method includes steps occurring at a Diameter signaling router (DSR) comprising a plurality of Diameter message processors. The method includes receiving a Diameter request message. The method further includes generating a hop-by-hop identifier for identifying a first Diameter message processor of the plurality of Diameter message processors. The method further includes incorporating the hop-by-hop identifier into the Diameter request message. The method further includes routing the Diameter request message to a first Diameter node.

26 Claims, 6 Drawing Sheets

Related U.S. Application Data

(60) Provisional application No. 61/658,399, filed on Jun. 11, 2012, provisional application No. 61/304,310, filed on Feb. 12, 2010, provisional application No. 61/373,636, filed on Aug. 13, 2010.

(51) Int. Cl.
*H04L 29/06* (2006.01)
*H04L 12/773* (2013.01)

(52) U.S. Cl.
CPC ........ *H04L 45/304* (2013.01); *H04L 63/0892* (2013.01); *H04L 45/60* (2013.01)

(56) References Cited

U.S. PATENT DOCUMENTS

| | | |
|---|---|---|
| 6,819,652 B1 | 11/2004 | Akhtar et al. |
| 6,865,153 B1 | 3/2005 | Hill et al. |
| 6,915,345 B1 | 7/2005 | Tummala et al. |
| 7,257,636 B2 | 8/2007 | Lee et al. |
| 7,333,438 B1 | 2/2008 | Rabie et al. |
| 7,333,482 B2 | 2/2008 | Johansson et al. |
| 7,403,492 B2 | 7/2008 | Zeng et al. |
| 7,822,023 B2 | 10/2010 | Lahetkangas et al. |
| 7,898,957 B2 | 3/2011 | Lea et al. |
| 8,155,128 B2 | 4/2012 | Balyan et al. |
| 8,478,828 B2 | 7/2013 | Craig et al. |
| 8,578,050 B2 | 11/2013 | Craig et al. |
| 8,644,324 B2 | 2/2014 | Kanode et al. |
| 8,799,391 B2 | 8/2014 | Craig et al. |
| 2001/0024443 A1 | 9/2001 | Alriksson et al. |
| 2002/0049901 A1 | 4/2002 | Carvey |
| 2002/0051427 A1 | 5/2002 | Carvey |
| 2002/0087723 A1 | 7/2002 | Williams et al. |
| 2002/0141346 A1 | 10/2002 | Garcia-Luna-Aceves et al. |
| 2003/0095536 A1 | 5/2003 | Hu et al. |
| 2003/0115358 A1 | 6/2003 | Yun |
| 2003/0225938 A1 | 12/2003 | Glasco et al. |
| 2004/0037278 A1 | 2/2004 | Wong et al. |
| 2005/0235065 A1 | 10/2005 | Le et al. |
| 2006/0077986 A1 | 4/2006 | Rune |
| 2006/0101159 A1 | 5/2006 | Yeh et al. |
| 2007/0076600 A1 | 4/2007 | Ekl et al. |
| 2008/0195742 A1* | 8/2008 | Gilfix ................ H04L 63/0892 709/230 |
| 2008/0212576 A1 | 9/2008 | O'Neill |
| 2009/0080440 A1 | 3/2009 | Balyan et al. |
| 2009/0265467 A1* | 10/2009 | Peles ................ H04L 47/10 709/226 |
| 2009/0307751 A1 | 12/2009 | Lin et al. |
| 2009/0319686 A1 | 12/2009 | Watanabe |
| 2010/0017846 A1 | 1/2010 | Huang et al. |
| 2010/0135287 A1 | 6/2010 | Hosain et al. |
| 2010/0299451 A1 | 11/2010 | Yigang et al. |
| 2011/0200053 A1 | 8/2011 | Kanode et al. |
| 2011/0200054 A1* | 8/2011 | Craig ................ H04L 63/0892 370/401 |
| 2011/0202676 A1 | 8/2011 | Craig et al. |
| 2011/0202684 A1 | 8/2011 | Craig et al. |
| 2011/0314178 A1 | 12/2011 | Kanode et al. |
| 2012/0034900 A1 | 2/2012 | Agarwal |
| 2013/0010798 A1* | 1/2013 | Shaffer ................ H04L 12/569 370/395.42 |

FOREIGN PATENT DOCUMENTS

| | | |
|---|---|---|
| CN | 101494608 A | 7/2009 |
| CN | 20118001681.X | 2/2011 |
| CN | 201180018814.2 | 2/2011 |
| CN | ZL 201180018952.0 | 5/2016 |
| EP | 1 134 939 A1 | 9/2001 |
| EP | 2 887 617 A1 | 6/2015 |
| EP | 2 887 617 B1 | 5/2016 |
| WO | WO 2009/070179 A1 | 6/2009 |
| WO | WO 2009070179 A1 * | 6/2009 ........... H04L 45/306 |
| WO | WO 2009/128837 A1 | 10/2009 |
| WO | WO 2011/100587 A2 | 8/2011 |
| WO | WO 2011/100600 A2 | 8/2011 |

OTHER PUBLICATIONS

Notice of Allowance and Fee(s) Due for U.S. Appl. No. 13/026,060 (Sep. 25, 2013).
Commonly-Assigned, Co-Pending U.S. Appl. No. 13/932,608 titled "Methods, Systems, and Computer Readable Media for Inter-Diameter-Message Processor Routing," (unpublished, filed Jul. 1, 2013).
Notice of Allowance and Fee(s) Due for for U.S. Appl. No. 13/026,076 (Jun. 27, 2013).
Final Office Action for U.S. Appl. No. 13/026,060 (May 10, 2013).
Notice of Allowance and Fee(s) Due for U.S. Appl. No. 13/025,968 (Feb. 27, 2013).
Final Official Action for U.S. Appl. No. 13/026,076 (Dec. 7, 2012).
Communication of European Publication No. and Information on the Application of Article 67(3) EPC for European Patent Application No. 11742906.8 (Nov. 21, 2012).
Communication of European Publication No. and Information on the Application of Article 67(3) EPC for European Patent Application No. 11742905.0 (Nov. 21, 2012).
Communication of European Publication No. and Information on the Application of Article 67(3) EPC for European Patent Application No. 11742894.6 (Nov. 21, 2012).
Non-Final Official Action for U.S. Appl. No. 13/026,060 (Sep. 19, 2012).
Non-Final Official Action for U.S. Appl. No. 13/026,076 (Jun. 4, 2012).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024588 (Oct. 20, 2011).
Traffix Systems, "Datasheet; Traffix Signaling Delivery Controller (SDC)," pp. 1-5 (May 2011).
Znaty, "Diameter, GPRS, (LTE+ePC=EPS), IMS, PCC and SDM," EFORT (May 2010). (Part 1 of 2, pp. 1-229).
Znaty, "Diameter, GPRS, (LTE+ePC=EPS), IMS, PCC and SDM," EFORT (May 2010). (Part 2 of 2, pp. 230-460).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)" ETSI TS 129 305 V9.0.0 (Jan. 2010).
"Digital Cellular Telecommunications System (Phase 2+); Universal Mobile Telecommunications (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
Jones et al., "Diameter Extended NAPTR," Individual Submission Internet-Draft, draft-ietf-dime-extended-naptr-00, pp. 1-9 (Dec. 29, 2009).

(56) References Cited

OTHER PUBLICATIONS

Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft, <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Seo. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Kerhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TS 29.909 V8.1.2 (Jan. 2009).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4284, pp. 1-17 (Dec. 2005).
Calhoun et al., "Diameter Mobile IPv4 Application," Network Working Group, RFC 4004, pp. 1-50 (Aug. 2005).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al,' "Bi-Directional Session Setup Extension to Diameter," Internet Draft <draft-greene-diameter-ss7-session-00.txt>, pbs. 1-12 (Jul. 1998).
Notification of the Third Office Action for Chinese Application No. 201180018952.0 (Sep. 15, 2015).
Letter regarding Notification to Grant for Chinese Patent Application No. ZL201180018814.2 (Jul. 20, 2015).
Extended European Search Report for European Application No. 11742906.8 (Jun. 26, 2015).
Extended European Search Report for European Application No. 15151390.0 (May 15, 2015).
Letter regarding Decision to Grant for Chinese Patent Application No. ZL201180013681.X (Apr. 13, 2015).
Communication of European Publication No. and Information on the Application of Article 67(3) EPC for European Patent Application No. 13805080.2 (Mar. 18, 2015).
Second Office Action for Chinese Patent Application No. 201180018952.0 (Feb. 16, 2015).
First Office Action for Chinese Patent Application No. 201180018814.2 (Oct. 30, 2014).
First Office Action for Chinese Application No. 201180013681.X (Aug. 18, 2014).
First Office Action for Chinese Patent Application No. 201180018952.0 (Jun. 26, 2014).
Notice of Allowance and Fee(s) Due for U.S. Appl. No. 13/932,608 (Apr. 9, 2014).
Notification of Transmittal of the International Search Report and the Written Opinion of the International Searching Authority, or the Declaration for International Application No. PCT/US2013/045188 (Feb. 27, 2014).
Extended European Search Report for European Application No. 11742905.0 (Dec. 11, 2013).
Extended European Search Report for European Application No. 11742894.6 (Dec. 3, 2013).
Tsou et al., "Diameter Routing Extensions," draft-tsou-dime-base-routing-ext-04, Internet-Draft, pp. 1-28 (Jul. 29, 2008).
Ravikumar et al., "Star-Graph Based Multistage Interconnection Network for ATM Switch Fabric," Parallel and Distributed Processing, pp. 1-8 (Oct. 26, 1994).
Decision to grant a European patent pursuant to Article 97(1) EPC for European Patent Application No. 15151390.0 (Apr. 29, 2016).
Letter Regarding Notification of Grant for Chinese Patent Application No. 201180018952.0 (Mar. 1, 2016).
Communication under Rule 71(3) EPC for European Patent Application No. 15 151 390.0 (Feb. 18, 2016).
Extended European Search Report for European Application No. 13805080.2 (Feb. 3, 2016).
Fajardo et al., "Diameter Base Protocol," draft-ietf-dime-rfc3588bis-33.txt, pp. 1-154 (May 7, 2012).

\* cited by examiner

METHODS, SYSTEMS, AND COMPUTER READABLE MEDIA FOR ROUTING DIAMETER MESSAGES AT A DIAMETER SIGNALING ROUTER

PRIORITY CLAIM

This application claims the benefit of U.S. Provisional Patent Application Ser. No. 61/658,399, filed Jun. 11, 2012; the disclosure of which is incorporated herein by reference in its entirety. This application is a continuation-in-part of U.S. patent application Ser. No. 13/026,076, filed Feb. 11, 2011, which claims the benefit of U.S. Provisional Patent Application Ser. No. 61/304,310 filed Feb. 12, 2012 and U.S. Provisional Patent Application Ser. No. 61/373,636 filed Aug. 13, 2010.

TECHNICAL FIELD

The subject matter described herein relates to Diameter communications. More specifically, the subject matter relates to methods, systems, and computer readable media for routing diameter messages at a Diameter signaling router.

BACKGROUND

The Diameter protocol is a next generation authentication, authorization, and accounting (AAA) protocol. The Diameter base protocol is defined in IETF RFC 6733, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

The above-referenced Diameter RFC does not specify an architecture for Diameter routing or processing nodes. Likewise, the standards do not specify a method for routing when a Diameter element includes a distributed architecture. Accordingly, a need exists for methods, systems, and computer readable media for routing diameter messages at a Diameter signaling router.

SUMMARY

According to one aspect, the subject matter described herein includes a method for routing Diameter messages. The method includes steps occurring at a Diameter signaling router (DSR) comprising a plurality of Diameter message processors. The method includes receiving a Diameter request message. The method further includes generating a hop-by-hop identifier for identifying a first Diameter message processor of the plurality of Diameter message processors. The method further includes incorporating the hop-by-hop identifier into the Diameter request message. The method further includes routing the Diameter request message to a first Diameter node.

According to one aspect, the subject matter described herein includes a method for routing Diameter messages. The method includes steps occurring at a Diameter signaling router (DSR). The method includes receiving, from a first Diameter node, a Diameter message, wherein the Diameter message is associated with a message priority value. The method further includes assigning priority levels to a plurality of Diameter connections. The method further includes selecting a Diameter connection associated with a priority level that corresponds to the message priority value.

According to another aspect, the subject matter described herein includes a system for routing Diameter messages. The system includes a Diameter signaling router. The Diameter signaling router includes a plurality of Diameter message processors. A first Diameter message processor of the plurality of Diameter message processors is configured to: receive, from a first Diameter node, a Diameter message, generate a hop-by-hop identifier for identifying the first Diameter message processor, incorporating the hop-by-hop identifier into the Diameter request, and routing the Diameter message to a second Diameter node According to another aspect, the subject matter described herein includes a system for routing Diameter messages. The system includes a Diameter signaling router. The Diameter signaling router is configured to: receive, from a Diameter node, a Diameter message, assign connection priority levels for a plurality of Diameter connections, and select a Diameter connection associated with a priority level that corresponds to the message priority.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
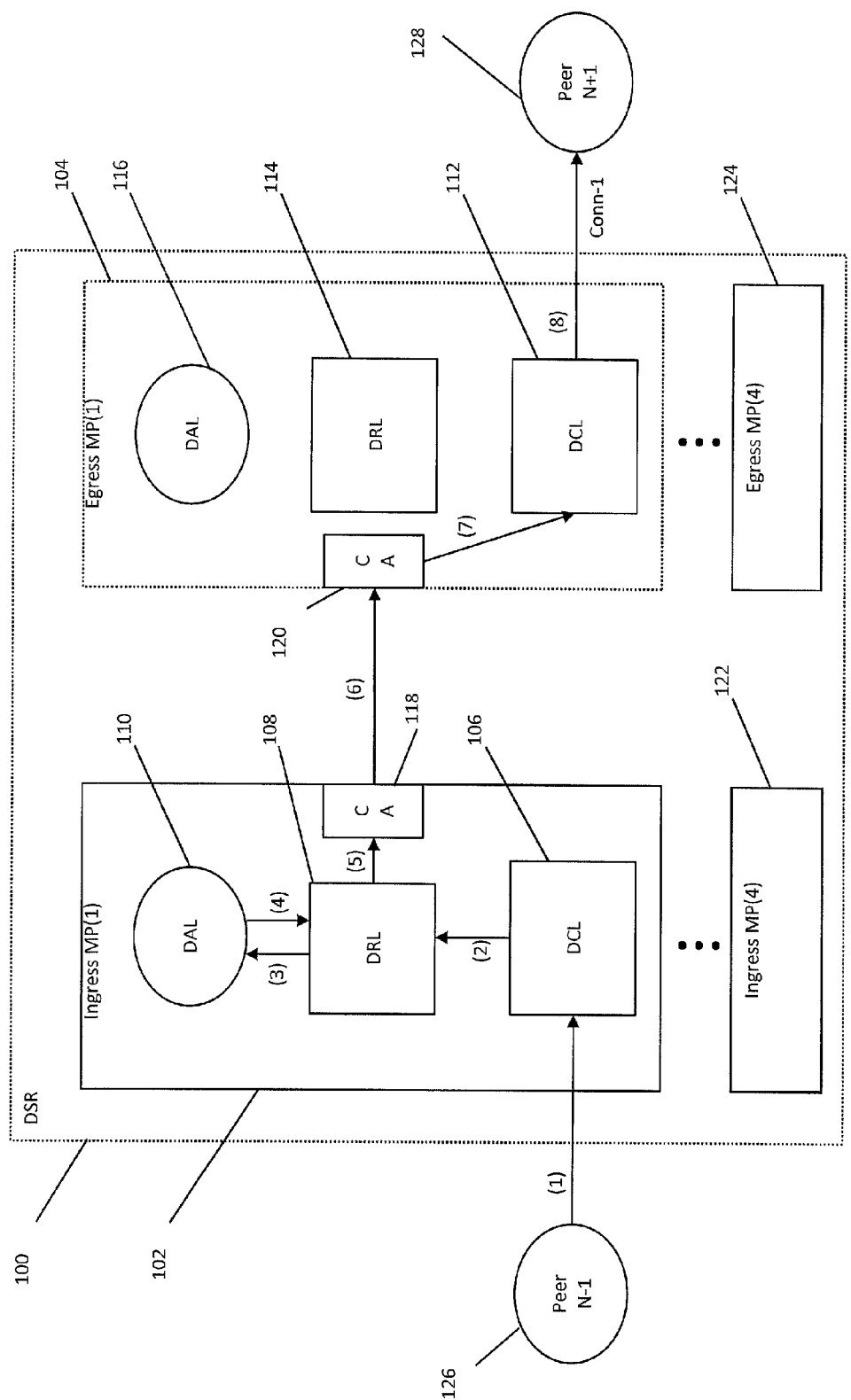
FIG. 1 is a network diagram illustrating a Diameter signaling router (DSR) which includes multiple Diameter message processors (MPs) according to an embodiment of the subject matter described herein.

A Diameter signaling router (DSR) may be any suitable entity for routing or relaying Diameter messages between Diameter nodes. For example, a DSR may be a long term evolution (LTE) signaling router, an LTE Diameter signaling router, a Diameter signaling agent, a Diameter proxy agent, a Diameter relay agent, a Diameter routing agent, a Diameter translation agent, and/or a Diameter redirect agent. A DSR may include functionality for processing various messages. In some embodiments, a DSR may communicate with various Diameter nodes via one or more 3rd generation partnership project (3GPP) LTE communications interfaces. In another embodiment, a DSR may communicate with various Diameter nodes via one or more other (e.g., non-LTE) communications interfaces. For example, a DSR may communicate with Internet protocol (IP) multimedia subsystem (IMS) nodes, such as call session control functions (CSCFs), using IMS-related interfaces.

In some embodiments, a DSR may include multiple Diameter agents or nodes and/or may include multiple MPs, where each MP is a distinct message processing module of a distributed computing platform, a computing blade in a blade-based distributed computing platform, a processing core element associated with a single or multi-core computing device, or a virtual node instantiated on a single physical message processing/computing device. As such, a DSR may be located in a single distinct geographic location and communicate via an internal communications network, or may include multiple MPs located in geographically diverse locations and communicating via an external communications network.

As a logical entity, a DSR is extremely scalable, and may be designed according to multiple architectural options. A first architecture option may include where each MP supports a full Diameter stack that includes a Diameter connection level (DCL), a Diameter routing layer (DRL), and an application layer, e.g., a Diameter application layer (DAL). A second architecture option may include a DCL that runs on dedicated MPs, with routing and application layers either combined on MPs or each having dedicated MPs. A third architecture option may include a Diameter stack (DCL/DRL) that runs on dedicated MPs, with local Diameter applications running on separate dedicated MPs. Each of these exemplary architecture options will now be described in greater detail below.

Diameter MPs may be associated with a single Diameter identity. For example, a first Diameter MP and a second Diameter MP may be associated with a single Diameter identity "X" and appear as a single. Diameter entity or node having Diameter identity "X," both from the perspective of a Diameter peer node "A" and the perspective of a Diameter peer node "B". In such an embodiment, a DSR may also appear as a single Diameter entity having Diameter identity "X," both from the perspective of Diameter peer node "A" and the perspective of Diameter peer node "B".

In another embodiment, Diameter MPs may be associated with different Diameter identities. For example, a first Diameter MP may be associated with Diameter identity "X" and a Diameter MP may be associated with Diameter identity "Y". In such an embodiment, the first Diameter MP and the second Diameter MP may appear as single Diameter entities, respectively having Diameter identities "X" and "Y," while the DSR may appear as a single Diameter entity having multiple Diameter identities. For example, from the perspective of Diameter peer node "A", a DSR may have Diameter identity "X"; while from the perspective of Diameter peer node "B", the DSR may have Diameter identity "Y".

FIG. 1 is a network diagram illustrating an exemplary network that includes a DSR 100 which includes multiple Diameter MPs according to an embodiment of the subject matter described herein. Referring to FIG. 1, DSR 100 may include ingress MP 102 for receiving Diameter messages from peers and egress MP 104 for transmitting Diameter messages to peers. Ingress MP 102 and egress MP 104 may each include a DCL, a DRL, and a DAL. For example, ingress MP 102 may include DCL 106, DRL 108, and DAL 110. Likewise, egress MP 104 may include DCL 112, DRL 114, and DAL 116. In some embodiments, in order to communicate between ingress MP 102 and egress MP 104, each MP may include a communications agent (CA), such as CA 118 and CA 120. CAs may be interfaces or other entities for providing inter-MP communications. For example, CA 118 and CA 120 may be connected to an internal mesh network or a bus system for sending messages, statuses, or other information to MPs or other entities in DSR 100. In some embodiments, DRL 108 of ingress MP 102 may be operable to communicate with DRL 114 and DCL 112 of egress MP 104. Additionally, DRLs 108 and 114 may each be operable to communicate with DCLs 106 and 112 and DALs 110 and 116, respectively.

In an exemplary Diameter message routing scenario, Peer N−1 126 may send a Diameter message to DSR 100. The Diameter message may be received by DCL 106 of ingress MP 102. Ingress messages may be processed completely on ingress MP 102 up through the selection of a next-hop peer for the Diameter message by DRL 108. Continuing the exemplary scenario above, DCL 106 may pass the Diameter message to DRL 108.

If application processing is required, ingress DRL 108 may forward the Diameter message to a Diameter message processor hosting a local application(s). For example, DRL 108 may forward the Diameter message to an MP hosting local DAL 110, which processes the message and returns the message to DRL 108. It is appreciated that the application distribution function may not be required.

Next, ingress DRL 108 may forward the Diameter message to a CA 118. CA 118 may send the Diameter message to a remote CA 120. CA 120 may forward the Diameter message to a local queue at DCL 112. Egress DCL 112 may then transmit the Diameter message to Peer N+1 128.

In an additional exemplary Diameter message routing scenario (not illustrated), Peer N−1 126 may send a Diameter message to DSR 100. The Diameter message may be received by DCL 106 of ingress MP 102. DCL 106 may forward the message to DRL 108. If application processing is required, ingress DRL 108 may forward the Diameter message to a local application at DAL 110, which processes the message and returns the message to DRL 108. Next, ingress DRL 108 may forward the Diameter message to egress DCL 112 (e.g., with or without using CAs 118 and 120), which may then transmit the Diameter message to Peer N+1 128.

In an additional exemplary Diameter message routing scenario (not illustrated), Peer N−1 126 may send a Diameter message to DSR 100. The Diameter message may be received by DCL 106 of ingress MP 102. DCL 106 may pass (e.g., using CA 118) the Diameter message to DRL 114 of egress MP 104. If application processing is required, egress DRL 114 may forward the Diameter message to a local application at DAL 116, which processes the message and returns the message to DRL 114. Next, egress DRL 114 may forward the Diameter message to egress DCL 112, which may then transmit the Diameter message to Peer N+1 128.

In some embodiments, Diameter MPs may utilize copies of the same routing information stored at each Diameter MP. For example, Diameter MPs 102, 104, 122, and 124 may respectively utilize copies of the same routing information stored in one or more data structures (e.g., in a memory or computer readable medium). In some embodiments, Diameter MPs may use one or more peer routing tables (PRTs) for inter-node routing and/or one or more route list tables (RLTs) for inter-MP routing. In some embodiments, information from a PRT and RLT may be combined or integrated into a data structure and may be referred a PRT/RLT. For example, Diameter MP 308 may utilize a PRT/RLT to route a Diameter message received from Peer N−1 126 and destined for Peer N+1 128 to egress MP 104, as identified by the PRT/RLT. Moreover, because a PRT/RLT may identify next-hop Peer N+1 128 and an egress connection "Conn-1" existing between egress MP 104 and Peer N+1 128, a subsequent Diameter lookup at egress MP 104 may not be required. In another embodiment, Diameter MPs may utilize common routing information stored in a shared repository.

Figure 2:
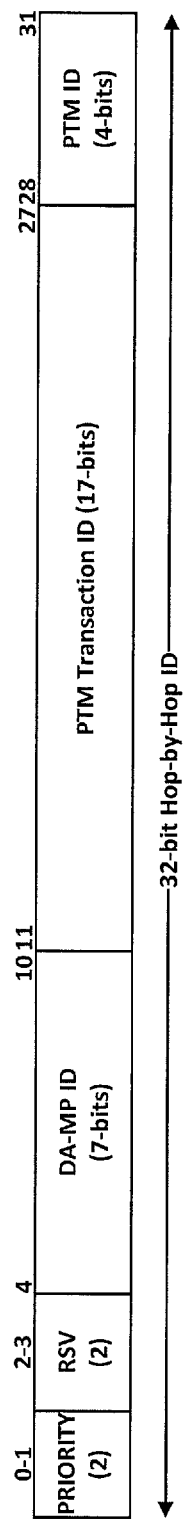
FIG. 2 is a diagram illustrating an exemplary Diameter message hop-by-hop identifier according to an embodiment of the subject matter described herein.

FIG. 2 is a diagram illustrating an exemplary Diameter message hop-by-hop identifier according to an embodiment of the subject matter described herein. In some embodiments, a hop-by-hop identifier may include one or more bits of data. In the embodiment illustrated in FIG. 2, a hop-by-hop identifier may include 32 bits of data. The hop-by-hop identifier may include various portions, such as a message priority value portion, a reserved portion, an MP identifier portion, a pending transaction manager (PTM) transaction identifier portion, and a PTM identifier portion. In some embodiments, a hop-by-hop identifier or portions therein may include one or more attribute value pairs (AVPs).

A message priority value portion of a hop-by-hop identifier may include one or more bits (e.g., 2 bits) of data for indicating a priority value of an associated message. For example, a Diameter request message may be associated with a hop-by-hop identifier that includes a message priority value between 0-3. In some embodiments, priority values may affect various processing decisions, such as when a message is sent to a destination and what resources are used to send or process the message.

A reserved portion of a hop-by-hop identifier may include one or more bits (e.g., 2 bits) of data reserved for future use or other purposes. For example, a Diameter request message may include a reserved portion that can be used for functionality defined or determined at a later date. In another example, a Diameter request message may include a unique value in a reserved portion to indicate a test packet.

An MP identifier portion of a hop-by-hop identifier may include one or more bits (e.g., 7 bits) of data for indicating a unique identifier associated with an MP. For example, DSR 100 may include eight MPs. Each MP may be associated with a unique number between 1 and 8.

A PTM transaction identifier portion of a hop-by-hop identifier may include one or more bits (e.g., 17 bits) of data for indicating a Diameter transaction identifier associated with a PTM. A PTM may be a module (e.g., hardware, firmware, or software executing on a processor) configured to perform one or more various actions, such as routing received Diameter request messages to other MPs, creating or modifying Diameter messages (e.g., generating a hop-by-hop identifier that includes an MP identifier), assigning or monitoring priority levels, processing associated Diameter answer messages, and/or other functions. In some embodiments, one or more PTMs may be associated with a DRL (e.g., DRL 108).

In some embodiments, the PTM transaction identifier may uniquely identify related messages. For example, a PTM may generate a transaction identifier "T2" and associate the identifier with a Diameter request message sent from Diameter node "A" for processing by Diameter node "B". In this example, a Diameter answer message sent from Diameter node "B" to Diameter node "A" in response to the Diameter request message may also include the transaction identifier "T2".

A PTM identifier portion of a hop-by-hop identifier may include one or more bits (e.g., 4 bits) of data for indicating a unique identifier associated with a PTM. For example, DRL 108 may include 16 PTMs. Each PTM may be associated with a unique number between 0 and 15.

Figure 3:
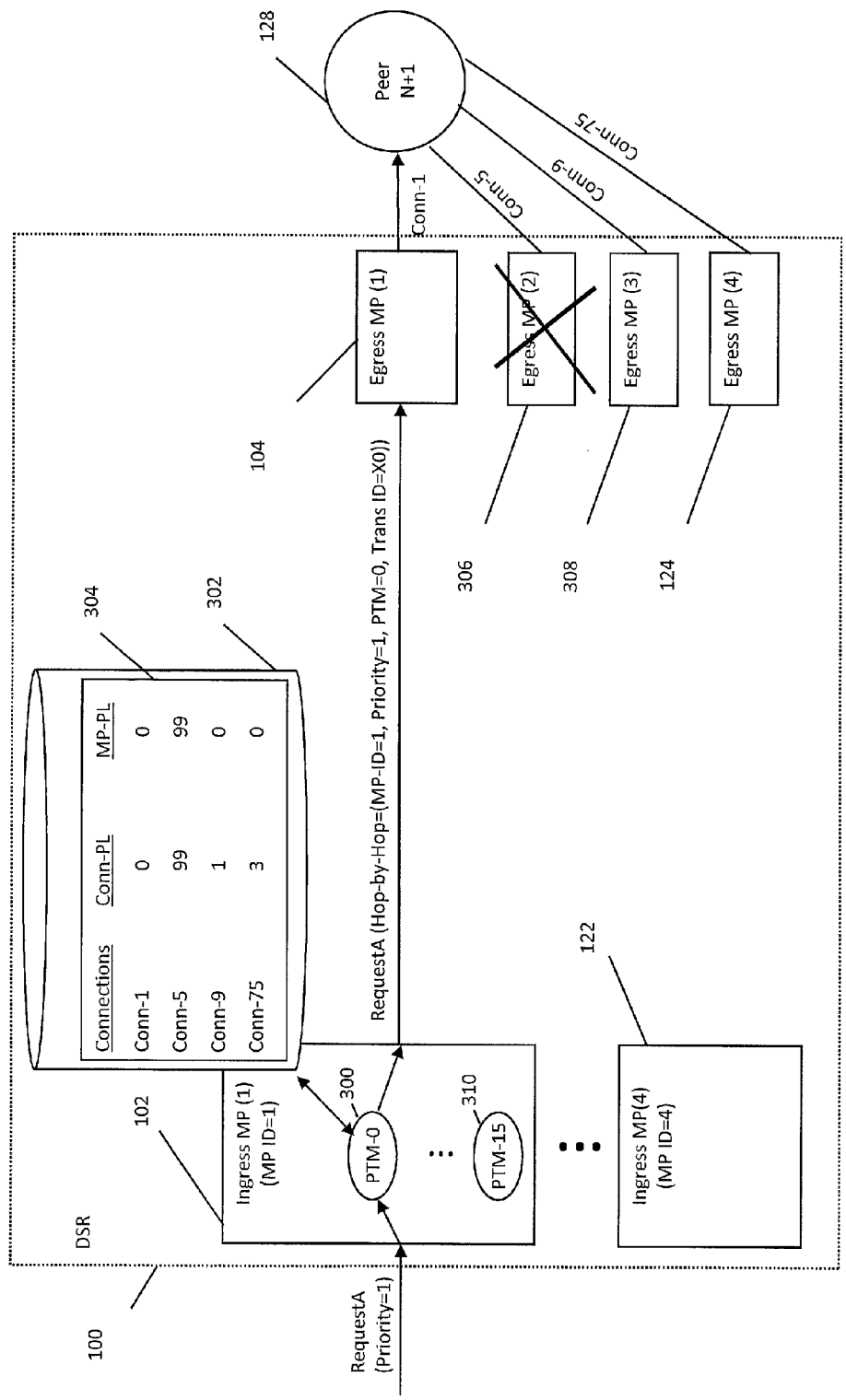
FIG. 3 is a diagram illustrating an exemplary Diameter request message being routing according to an embodiment of the subject matter described herein.

FIG. 3 is a diagram illustrating an exemplary Diameter request message being routing according to an embodiment of the subject matter described herein. As depicted in FIG. 3, a Diameter request message "A" may be received at ingress MP 102. In some embodiments, the received Diameter request message may include a message priority value of 1. In some embodiments, DSR 100, or a module therein, may determine or generate a message priority value associated with the Diameter request message.

The Diameter request message may be forwarded to a PTM-0 300 by DCL 106. PTM-0 300 may be associated with, implemented in, or part of DRL 108. In one example, PTM-0 300 may be selected from multiple PTMs. The selection may be based on one or more factors, such as load conditions, services, applications, or MP operational status. Selection may also be based on one or more selection algorithms, such as load-balancing, round robin, resource utilization, or another method.

PTM-0 300 or another module may generate and/or modify various information (e.g., message headers or AVPs) associated with the Diameter request message. In some embodiments, PTM-0 300 or another module may generate or modify a hop-by-hop identifier. The hop-by-hop identifier may be used for identifying a Diameter transaction between DSR 100 and an external Diameter node. PTM-0 300 or another module may include an MP identifier for identifying an MP (e.g., ingress MP (1) 102) associated with PTM-0 300 and other identifiers, such as a PTM identifier and a PTM transaction identifier. PTM-0 300 or another module may also include a Diameter connection identifier in a hop-by-hop identifier or other message portion. The Diameter connection identifier may be usable for identifying a Diameter connection usable for transmitting or receiving the Diameter request message. After generating or modifying a hop-by-hop identifier, PTM-0 300 or another module may incorporate the hop-by-hop identifier into the Diameter request message. For example, as shown in FIG. 3, the Diameter request message "A" may be modified to include a hop-by-hop identifier indicating an MP identifier of "1", a message priority value of "1", a PTM identifier of "0", and transaction identifier of "X0". In this example, the hop-by-hop identifier may be stored in one or more AVPs or in one or more header parameter portions of the Diameter message.

PTM-0 300 may determine using various routing information an egress connection based on an intended destination for a Diameter message. For example, PTM-0 300 may access a routing database 302 (e.g., a PRT and/or a RLT). Routing database 302 may include information (e.g., data structures) for determining an appropriate egress connection. In one exemplary data structure (not shown), various destinations may be associated with one or more routing groups (e.g., logical groupings of routes to a destination). In an exemplary data structure 304, connections associated with a particular routing group may be associated with various priority levels. Priority levels may be used in making various routing decisions and may be a general indication for a route or connection's usability (e.g., speed, reliability, and/or proximity).

In some embodiments, priority levels may be single, normalized values (e.g., integers between 0-99) computed using status information associated with the first message processor, status information associated with a communications bus or network within the Diameter signal router, and status information associated with the first Diameter connection. For example, a priority level of "0" may indicate a highly desirable connection, while a priority level of "99" may indicate a connection that is inoperable. In another example, a priority level of "99" may indicate a highly desirable connection, while a priority level of "0" may indicate a connection that is inoperable.

In data structure 304, a connection priority level (conn-PL) value may indicate a priority level associated with a connection and a message processor priority level (MP-PL) value may indicate a priority level associated with an MP. In some embodiments, data structure 304 may include a combined or total priority level value based on two or more associated priority level values. For example, a connection '74' may have a total priority level of 0, which is the lowest value of its conn-PL and MP-PL, 3 and 0, respectively. In another example, a connection '74' may have a total priority level of 1.5 or an average of its conn-PL and MP-PL, 3 and 0, respectively. In yet another example, a connection '74' may have a total priority level of 3, which is the highest value of its conn-PL and MP-PL, 3 and 0, respectively.

PTM-0 300 or another module may select a connection for a Diameter message based on one or more associated priority levels and the associated message priority value. For example, PTM-0 300 may be configured to select a connection for a Diameter message that is associated with a priority level that is the same or less than a message priority value associated with the Diameter message to be sent. In another example, PTM-0 300 may be configured to select a connection for a Diameter message that is associated with a priority level that is greater than a message priority value associated with the Diameter message to be sent.

In some embodiments, a connection for a Diameter message may be selected based on a total priority level value. For example, an egress connection "Conn-1" may be selected for sending Diameter request message "A" since the egress connection is associated with a priority level of "0" and "0" is less than the message priority value (e.g., "1") associated with the Diameter request message "A".

After generating or modifying a hop-by-hop identifier and/or selecting an appropriate connection based on a priority level value and a message priority value, PTM-0 300 or another module may send the message (e.g., via an internal interface or network) to another MP, such as MP 104. MP 104 may send the Diameter request message to Peer N+1 128. For example, MP 104 may route the Diameter request message to its destination via egress connection "Conn-1".

Figure 4:
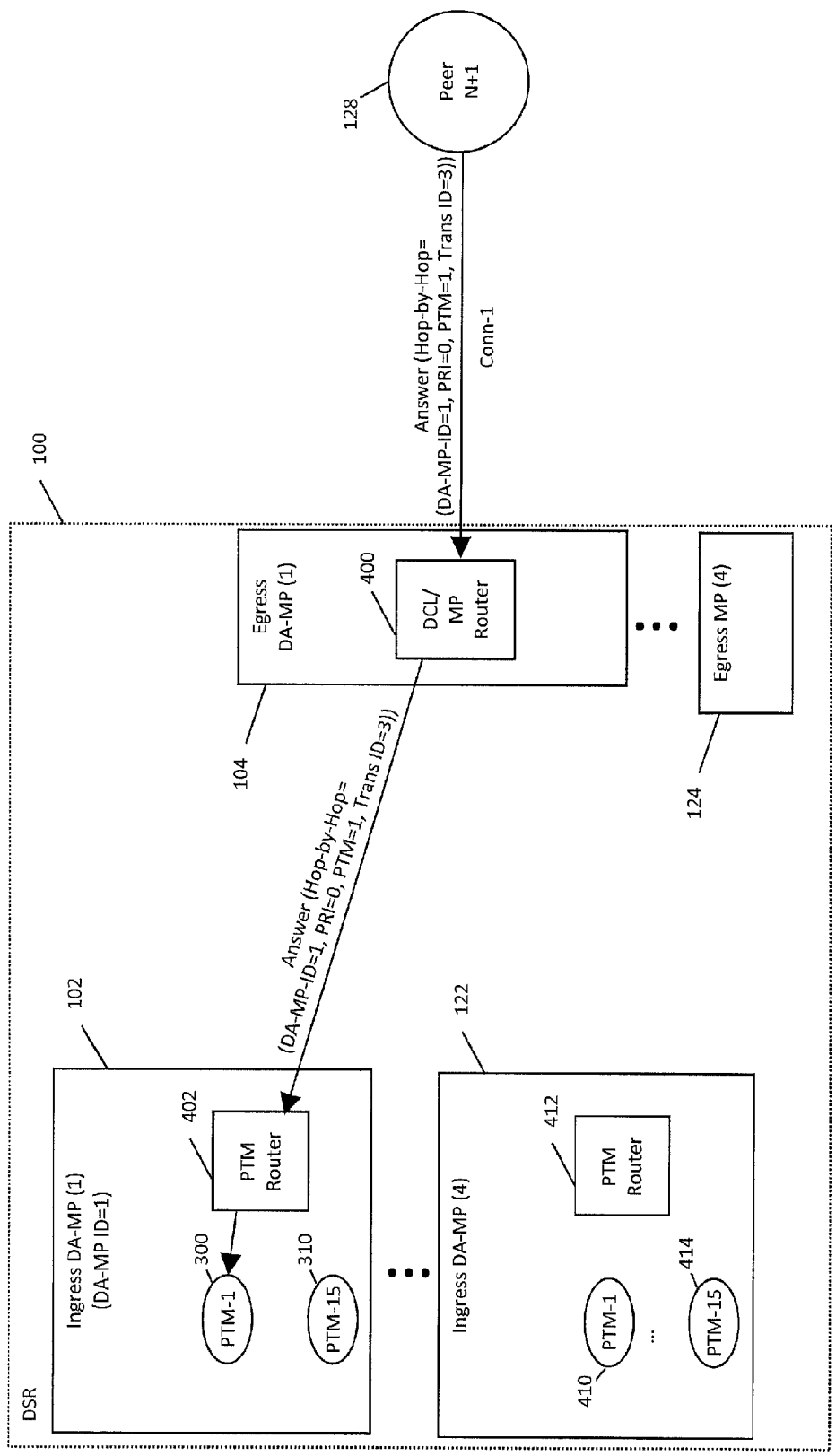
FIG. 4 is a diagram illustrating an exemplary Diameter answer message hop-by-hop identifier according to an embodiment of the subject matter described herein.

FIG. 4 is a diagram illustrating an exemplary Diameter answer message hop-by-hop identifier according to an embodiment of the subject matter described herein. In this embodiment, Peer N+1 128 may send a Diameter answer message in response to Diameter request message "A" described above with regard to FIG. 3. The Diameter answer message may include the hop-by-hop identifier associated with Diameter request message "A".

In some embodiments, the Diameter answer message may be sent to DSR 100 via the same connection used to send the Diameter request message "A" from DSR 100 to Peer N+1 128. The Diameter answer message may be received at MP 104 via egress connection "Conn-1" and provided to a DCL and/or MP (DCL/MP) router for further processing. DCL/MP router 400 may be any suitable entity (e.g., software executing at MP 104) for determining an MP for handling or processing Diameter messages. In some embodiments, DCL/MP router 400 may receive the Diameter answer message and may determine, based on the hop-by-hop identifier, which MP should process the Diameter answer message. For example, DCL/MP router 400 may extract, decipher, or otherwise determine an MP identifier in the hop-by-hop identifier. Based on the MP identifier, DCL/MP router 400 may determine that MP 102 is associated with the Diameter answer message and may communicate the Diameter answer message to MP 102 for further processing.

In some embodiments where a PTM router is not utilized, one or more DCLs or MPs may be configured to forward, communicate, or provide a Diameter message to an appropriate MP. For example, a Diameter answer message may be received at MP 104. MP 104 may determine, based on the hop-by-hop identifier, that that MP 102 is associated with the Diameter answer message and may communicate the Diameter answer message to MP 102 for further processing.

In some embodiments, after a Diameter answer message is received at MP 102, a PTM router 402 (e.g., associated with DCL 106) may receive the Diameter answer message. PTM router 402 may determine, based on the hop-by-hop identifier, which PTM should process the Diameter answer message. For example, PTM router 402 may extract, decipher, or otherwise determine a PTM identifier in the hop-by-hop identifier. Based on the PTM identifier, PTM router 402 may determine that PTM-0 300 is associated with the Diameter answer message and may communicate the Diameter answer message to PTM-0 300 for further processing.

In some embodiments where a PTM router is not utilized, one or more PTMs may be configured to forward, communicate, or provide a Diameter message to an appropriate PTM. For example, a Diameter answer message may be received at a PTM-15 310. PTM-15 310 may determine, based on the hop-by-hop identifier, that PTM-0 300 should process the Diameter answer message and may communicate the Diameter answer message to PTM-0 300 for further processing.

At PTM-0 300, the Diameter answer message may be processed and/or routed to another Diameter node. For example, PTM-0 300 may extract, decipher, or otherwise determine a transaction identifier and a message priority value in the hop-by-hop identifier. PTM-0 300 may use the transaction identifier as a lookup in routing database 302 for determining a destination for the Diameter answer message, e.g., Peer N−1 126 or other Diameter peer node. PTM-0 300 may also use the message priority value in determining which connection to send the Diameter answer message to its destination.

Figure 5:
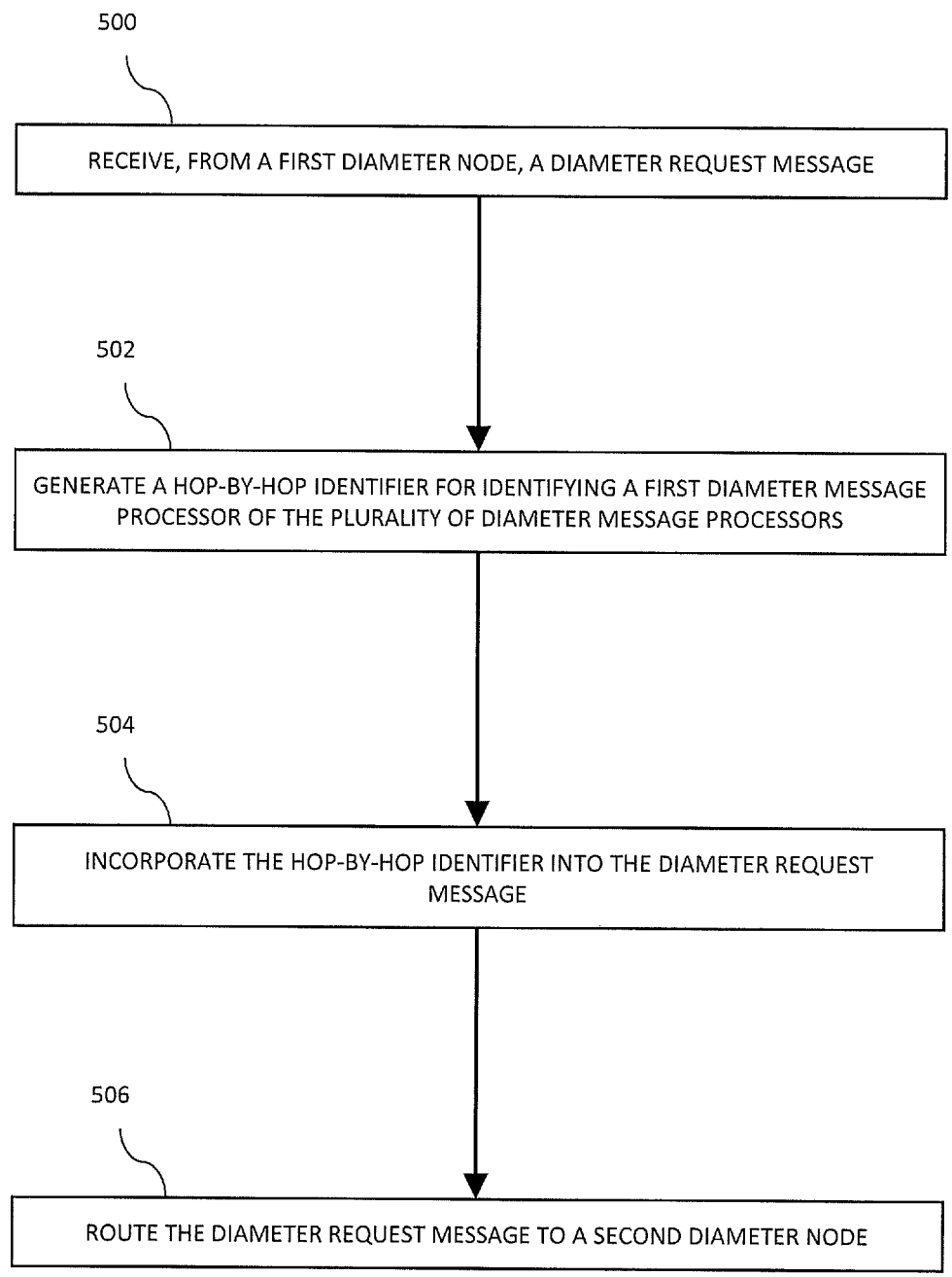
FIG. 5 is a diagram illustrating an exemplary process for routing Diameter messages according to an embodiment of the subject matter described herein.

FIG. 5 is a diagram illustrating an exemplary process for routing Diameter messages according to an embodiment of the subject matter described herein. Referring to the embodiment illustrated in FIG. 5, exemplary process may include steps 500, 502, 504, and 506. In some embodiments, the exemplary process described herein, or portions thereof, may be performed at or performed by DSR 100, ingress MP 102, egress MP 104, DCL 106, DRL 108, a MP, a PTM, DAL 110, CA 118, a Diameter agent, a Diameter application, a Diameter node, and/or another module or node.

At step 500, a Diameter request message may be received from a first Diameter node.

At step 502, a hop-by-hop identifier may be generated. The hop-by-hop identifier may be for identifying a first Diameter MP of a plurality of Diameter MPs associated with DSR 100. For example, a hop-by-hop identifier may be generated for a Diameter message and the hop-by-hop identifier may include information that indicates ingress MP 102 received or handled the Diameter request message.

In some embodiments, each of a plurality of Diameter MPs associated with DSR 100 may include or access a peer routing table.

In some embodiments, a hop-by-hop identifier may be usable for identifying a Diameter transaction between DSR 100 and a Diameter node (e.g., external to DSR 100).

In some embodiments, a hop-by-hop identifier may include a Diameter connection identifier for identifying a Diameter connection usable for transmitting or receiving the Diameter request message.

At step 504, the hop-by-hop identifier may be incorporated into the Diameter request message. For example, a hop-by-hop identifier may be added to a header portion of an existing Diameter message. In another example, a hop-by-hop identifier may be added to a header portion of a new Diameter message, where the new Diameter message includes at least some information or data from a pre-existing Diameter message (e.g., a received Diameter message associated with the hop-by-hop identifier).

At step 506, the Diameter request message may be routed to a second Diameter node. For example, the Diameter request may be routed to a Diameter server or peer node for further processing.

In some embodiments, after a Diameter request message containing a hop-by-hop identifier is sent to a second Diameter node, a Diameter answer message containing the hop-by-hop identifier and associated with the Diameter request message may be received from the second Diameter node. It may be determined, using the hop-by-hop identifier, that a first Diameter MP is associated with the Diameter answer message. For example, egress MP 104 may receive a Diameter answer message from a Diameter server. The Diameter answer message may be in response to a Diameter request message containing a hop-by-hop identifier. The Diameter answer message may also include the same hop-by-hop identifier and may indicate (e.g., to egress MP 104) that ingress MP 102 should handle (e.g., process) the Diameter answer message. After determining that a first Diameter MP is associated with the Diameter answer message, the Diameter answer message may be communicated to the first Diameter MP for processing.

It will be appreciated that steps 500-506 described above are illustrative. In some embodiments, additional and/or different steps may occur in routing Diameter messages. In some embodiments, steps for routing Diameter messages may be arranged differently and/or may occur in a different order or sequence (e.g., some steps may occur concurrently with, prior to, after other steps) than illustrated in FIG. 5.

Figure 6:
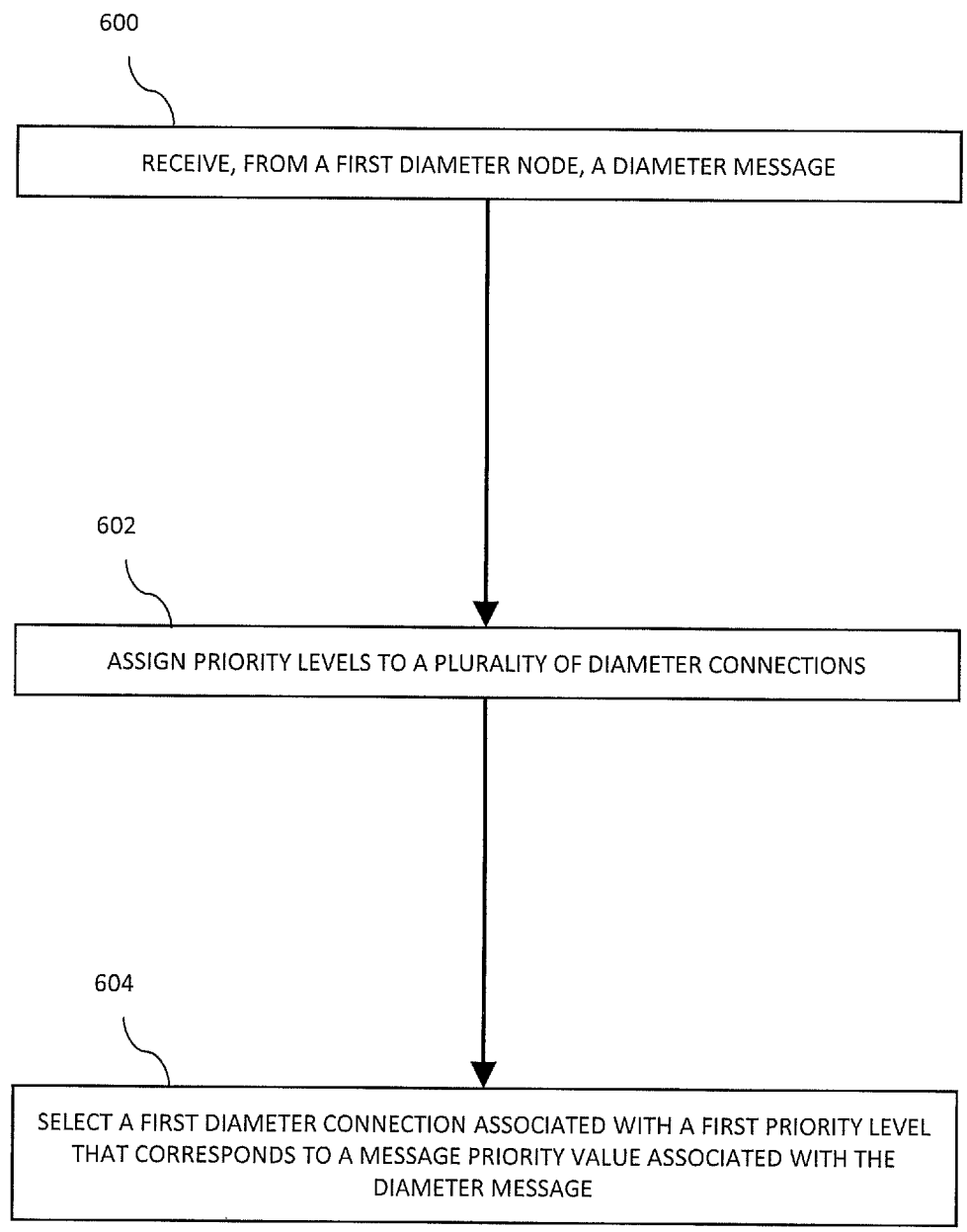
FIG. 6 is a diagram illustrating an exemplary process for routing Diameter messages according to another embodiment of the subject matter described herein.

FIG. 6 is a diagram illustrating an exemplary process for routing Diameter messages according to another embodiment of the subject matter described herein. Referring to the embodiment illustrated in FIG. 6, exemplary process may include steps 600, 602, and 604. In some embodiments, the exemplary process described herein, or portions thereof, may be performed at or performed by DSR 100, ingress MP 102, egress MP 104, DCL 106, DRL 108, a MP, a PTM, DAL 110, CA 118, a Diameter agent, a Diameter application, a Diameter node, and/or another module or node.

At step 600, a Diameter message may be received from a first Diameter node.

At step 602, priority levels may be assigned to a plurality of Diameter connections.

At step 604, select a first Diameter connection associated with a first priority level corresponding to a message priority value associated with the Diameter request message.

In some embodiments, a message priority value may be determined by the DSR or the first Diameter node.

In some embodiments, a message priority value may be based on a Diameter message type.

In some embodiments, a message priority value may be stored as a portion of a hop-by-hop identifier within the Diameter message.

In some embodiments, a first priority level may be less than or equal to the message priority value.

In some embodiments, a first priority level may be a normalized value (e.g., an integer) computed using at least one of status information associated with the first message processor, status information associated with a communications bus or network within the DSR, and status information associated with the first Diameter connection.

In some embodiments, status information associated with the first Diameter connection may include an operational status, a remote busy status, an egress transport status, or an egress message throttling status. In some embodiments, status information associated with a communications bus or network within the DSR may include an operational status or a routing congestion level. In some embodiments, status information associated with the first Diameter message processor may include a process status.

It will be appreciated that steps 600-604 described above are illustrative. In some embodiments, additional and/or different steps may occur in routing Diameter messages using priority levels. In some embodiments, steps for routing Diameter messages using priority levels may be differently and/or may occur in a different order or sequence than illustrated in FIG. 6. For example, a priority level may be assigned to a Diameter connection prior to, concurrently with, or subsequent to a Diameter request message being received.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing Diameter messages, the method comprising:

at a Diameter signaling router (DSR) comprising a plurality of Diameter message processors:
  at a first Diameter message processor of the plurality of Diameter message processors:
    receiving, from a first Diameter node, a Diameter request message;
    generating a hop-by-hop identifier for identifying the first Diameter message processor of the plurality of Diameter message processors, wherein the hop-by-hop identifier includes a message processor identifier that uniquely identifies the first Diameter message processor from among the plurality of Diameter message processors;
    incorporating the hop-by-hop identifier into the Diameter request message; and
    routing the Diameter request message to a second Diameter node;
  at a second Diameter message processor of the plurality of Diameter message processors:
    receiving, and from the second Diameter node, a Diameter answer message associated with the Diameter request message, wherein the Diameter answer message includes the hop-by-hop identifier;
    determining, using the hop-by-hop identifier, that the first Diameter message processor is associated with the Diameter answer message; and
    communicating the Diameter answer message to the first Diameter message processor for processing.

2. The method of claim 1 wherein the hop-by-hop identifier is used for identifying a Diameter transaction between the DSR and the second Diameter node.

3. The method of claim 1 wherein each of the plurality of Diameter message processors includes or accesses a peer routing table.

4. The method of claim 1 wherein the hop-by-hop identifier includes a Diameter connection identifier for identifying a Diameter connection usable for transmitting or receiving the Diameter request message.

5. The method of claim 1 wherein the first Diameter message processor comprises one of:
  a distinct message processing module of a distributed computing platform;
  a computing blade in a blade-based distributed computing platform;
  a processing core element associated with a single or multi-core computing device; and
  a virtual node instantiated on a single physical message processing or computing device.

6. A system for routing Diameter messages, the system comprising:
  a Diameter signaling router (DSR) comprising a plurality of Diameter message processors:
    a first Diameter message processor of the plurality of Diameter message processors, wherein the first Diameter message processor is configured to:
      receive, from a first Diameter node, a Diameter request message;
      generate a hop-by-hop identifier for identifying the first Diameter message processor of the plurality of Diameter message processors, wherein the hop-by-hop identifier includes a message processor identifier that uniquely identifies the first Diameter message processor from among the plurality of Diameter message processors;
      incorporate the hop-by-hop identifier into the Diameter request message; and
      route the Diameter request message to a second Diameter node; and
    a second Diameter message processor of the plurality of Diameter message processors, wherein the second Diameter message processor is configured to:
      receive, from the second Diameter node, a Diameter answer message associated with the Diameter request message, wherein the Diameter answer message includes the hop-by-hop identifier;
      determine, using the hop-by-hop identifier, that the first Diameter message processor is associated with the Diameter answer message; and
      communicate the Diameter answer message to the first Diameter message processor for processing.

7. The system of claim 6 wherein the hop-by-hop identifier is used for identifying a Diameter transaction between the DSR and the second Diameter node.

8. The system of claim 6 wherein each of the plurality of Diameter message processors includes or accesses a peer routing table.

9. The system of claim 6 wherein the hop-by-hop identifier includes a Diameter connection identifier for identifying a Diameter connection usable for transmitting or receiving the Diameter request message.

10. The system of claim 6 wherein the first Diameter message processor comprises one of:
  a distinct message processing module of a distributed computing platform;
  a computing blade in a blade-based distributed computing platform;
  a processing core element associated with a single or multi-core computing device; and
  a virtual node instantiated on a single physical message processing or computing device.

11. A non-transitory computer readable medium comprising computer executable instructions that when executed by a processor of a computer control the computer to perform steps comprising:
  at a Diameter signaling router (DSR) comprising a plurality of Diameter message processors:
    at a first Diameter message processor of the plurality of Diameter message processors:
      receiving, from a first Diameter node, a Diameter request message;
      generating a hop-by-hop identifier for identifying the first Diameter message processor of the plurality of Diameter message processors, wherein the hop-by-hop identifier includes a message processor identifier that uniquely identifies the first Diameter message processor from among the plurality of Diameter message processors;
      incorporating the hop-by-hop identifier into the Diameter request message;
      routing the Diameter request message to a second Diameter node;
    at a second Diameter message processor of the plurality of Diameter message processors:
      receiving, and from the second Diameter node, a Diameter answer message associated with the Diameter request message, wherein the Diameter answer message includes the hop-by-hop identifier;
      determining, using the hop-by-hop identifier, that the first Diameter message processor is associated with the Diameter answer message; and
      communicating the Diameter answer message to the first Diameter message processor for processing.

12. A method for routing Diameter messages, the method comprising:

at a first Diameter message processor in a Diameter signaling router (DSR):

receiving, from a first Diameter node, a Diameter message;

assigning priority levels (PL) to a plurality of Diameter connections; and selecting a first Diameter connection associated with a first priority level that corresponds to a message priority value associated with the Diameter message, wherein the message priority value is stored as a portion of a hop-by-hop identifier within the Diameter message.

13. The method of claim 12 wherein the message priority value is determined by the DSR or the first Diameter node.

14. The method of claim 12 wherein the message priority value is based on a Diameter message type.

15. The method of claim 12 wherein the first priority level is a single normalized value computed using status information associated with the first Diameter message processor, status information associated with a communications bus or network within the DSR, and status information associated with the first Diameter connection.

16. The method of claim 15 wherein the status information associated with the first Diameter connection includes an operational status, a remote busy status, an egress transport status, or an egress message throttling status, wherein the status information associated with a communications bus or network within the DSR includes an operational status or a routing congestion level, and wherein the status information associated with the first Diameter message processor includes a process status.

17. The method of claim 12 wherein the first priority level is less than or equal to the message priority value.

18. The method of claim 12 wherein the first Diameter message processor comprises one of:

a distinct message processing module of a distributed computing platform;

a computing blade in a blade-based distributed computing platform;

a processing core element associated with a single or multi-core computing device; and a virtual node instantiated on a single physical message processing or computing device.

19. A system for routing Diameter messages, the system comprising:

a Diameter signaling router (DSR) comprising:

a first Diameter message processor, wherein the first Diameter message processor is configured to:

receive, from a first Diameter node, a Diameter message;

assign priority levels to a plurality of Diameter connections; and select a first Diameter connection associated with a first priority level that corresponds to a message priority value associated with the Diameter message, wherein the message priority value is stored as a portion of a hop-by-hop identifier within the Diameter message.

20. The system of claim 19 wherein the message priority value is determined by the DSR or the first Diameter node.

21. The system of claim 19 wherein the message priority value is based on a Diameter message type.

22. The system of claim 19 wherein the first priority level is a single normalized value computed using status information associated with the first Diameter message processor, status information associated with a communications bus or network within the DSR, and status information associated with the first Diameter connection.

23. The system of claim 22 wherein the status information associated with the first Diameter connection includes an operational status, a remote busy status, an egress transport status, or an egress message throttling status, wherein the status information associated with a communications bus or network within the DSR includes an operational status or a routing congestion level, and wherein the status information associated with the first Diameter message processor includes a process status.

24. The system of claim 19 wherein the first priority level is less than or equal to the message priority value.

25. The system of claim 19 wherein the first Diameter message processor comprises one of:

a distinct message processing module of a distributed computing platform;

a computing blade in a blade-based distributed computing platform;

a processing core element associated with a single or multi-core computing device; and a virtual node instantiated on a single physical message processing or computing device.

26. A non-transitory computer readable medium comprising computer executable instructions that when executed by a processor of a computer control the computer to perform steps comprising:

at a first Diameter message processor in a Diameter signaling router (DSR):

receiving, from a first Diameter node, a Diameter message;

assigning priority levels to a plurality of Diameter connections; and selecting a first Diameter connection associated with a first priority level that corresponds to a message priority value associated with the Diameter message, wherein the message priority value is stored as a portion of a hop-by-hop identifier within the Diameter message.

* * * * *